United States Patent [19]
Lamort

[11] Patent Number: 5,182,031
[45] Date of Patent: Jan. 26, 1993

[54] PROCESS AND DEVICE FOR DEAERATION OF LIQUIDS

[75] Inventor: Jean-Pierre Lamort, Vitry le Francois, France

[73] Assignee: E & M Lamort (Societe Anonyme), Vitry le Francois, France

[21] Appl. No.: 541,158

[22] Filed: Jun. 20, 1990

[30] Foreign Application Priority Data

Jun. 21, 1989 [FR] France ................. 89 08247

[51] Int. Cl.$^5$ ............................................. B01D 33/06
[52] U.S. Cl. ................................ 210/781; 210/784; 210/787; 210/188; 210/358; 210/360.2; 210/377; 210/404; 55/52; 55/55; 494/54; 494/57; 494/58
[58] Field of Search ............. 210/781, 784, 787, 358, 210/188, 377, 360.1, 360.2, 404, 512.1; 162/380, 381; 55/52, 55; 494/54, 53, 56, 57, 58

[56] References Cited

U.S. PATENT DOCUMENTS

| | | | |
|---|---|---|---|
| 1,973,864 | 9/1934 | Biffar | 209/273 |
| 2,216,542 | 10/1940 | Paige | 55/52 |
| 2,634,907 | 4/1953 | Smith | 55/52 |
| 4,119,542 | 10/1978 | Yamaoka et al. | 210/360.2 |
| 4,410,337 | 10/1983 | Gullichsen et al. | 55/52 |
| 4,877,424 | 10/1989 | Perkola et al. | 55/52 |
| 4,921,400 | 5/1990 | Niskanen | 55/52 |

FOREIGN PATENT DOCUMENTS

| | | |
|---|---|---|
| 0147215 | 12/1984 | European Pat. Off. . |
| 0249856 | 12/1987 | European Pat. Off. . |
| 748712 | 5/1943 | Fed. Rep. of Germany . |
| 3038428 | 9/1980 | Fed. Rep. of Germany . |
| 511337 | 12/1974 | U.S.S.R. . |
| 1242199 | 7/1986 | U.S.S.R. . |

OTHER PUBLICATIONS

Patent Abstracts of Japan, vol. 6, No. 3 (C-86) [881], Jan. 9, 1982; and JP-A-56 129 011 (Tanaka Shiyokuhin Kikai K.K.).
Soviet Invention Illustrated, Section C, semaine 8708; Apr. 4, 1987, Derwent Publications Ltd., Londres No. 87-055 600/08; and Su-A-12 42 199 (Appld Biochem Res) Jul. 07, 1986.

*Primary Examiner*—Robert A. Dawson
*Assistant Examiner*—David Reifsnyder
*Attorney, Agent, or Firm*—Darby & Darby

[57] ABSTRACT

The device comprises a closed chamber (1) equipped with an inlet pipe (3) for the aerated liquid, an outlet pipe (4) for the deaerated liquid, and an air evacuation pipe (5); and a rotor having a shaft extending into the chamber. The shaft carries means (7) for centrifugation of the liquid and means (8,9,10) for intensive agitation of the centrifuged liquid.

The device works according to the following process: continuously, the liquid is introduced into the closed chamber and it is vigorously centrifuged there in with the aid of mechanical means (7) and simultaneously subjected to intensive agitation with the aid of second mechanical means (8,9,10).

The released air gathers freely at the center of the chamber whence it is evacuated, as the deaereated liquid is evacuated through the outlet pipe.

29 Claims, 2 Drawing Sheets

PROCESS AND DEVICE FOR DEAERATION OF LIQUIDS

BACKGROUND OF THE INVENTION

The present invention relates to a process and a device for deaeration of liquid, notably of paper pulp.

Paper pulp made from used paper generally involves, after the treatments of disintegration and primary purification, a stage of brightening the pulp by extraction of the pigments and inks, also called deinking.

This deinking is normally carried out by flotation: The paper pulp is injected under pressure into a vat through mixing injectors which form a foam, the bubbles of which catch the inks. The foam is then separated from the rest of the pulp by slow or fast flotation depending on the device used, and discharged.

This technique of flotation by production of foam can be used also for small and light-weight contaminants other than the ink.

However, while this technique gives good results as to the quality of the deinking of the pulp, it presents disadvantages in the treatment of the extracted foam.

In fact, after its removal the foam must be broken, this is, deaerated, firstly so as to reduce the large volume that it occupies, and then to separate the air from the pulp fraction it contains in order to recycle it.

The foam is generally destroyed in known separators. However, the collected liquid still presents a large amount of air in the form of very numerous very small bubbles; the density of the pulp is on the order of 0.7 to 0.5.

And this liquid which is to be re-used is difficult to transport precisely because of this presence of air: Pockets of air form in the pipes, preventing the use of classic pumps. It is then necessary to provide expensive volume displacement pumps.

SUMMARY OF THE INVENTION

It is the object of the present invention to provide an apparatus which completely deaerates the liquids, not by forced extraction of the air in the form of bubbles, but by extraction and release of the air contained in the liquid and in the bubbles that might form, so that, regardless of the amount of air contained in the liquid, this liquid will, after treatment, no longer contain any trace of air.

The object of the invention is a deaeration process of liquid and notably of paper pulp wherein the liquid is continuously introduced into a closed chamber, it is vigorously centrifuged with the aid of first mechanical means and simultaneously it is subjected to intense agitation with the aid of second mechanical means, in order to create great turbulences which release the air and allow it to gather freely, that is, without entrainment of bubbles, at the center of the chamber whence it is evacuated, and it is simultaneously and progressively directed toward an outlet pipe which evacuates it after deaeration.

Another object of the invention is a liquid deaeration device notably for paper pulp characterized in that it includes:
a closed chamber equipped with an inlet pipe for the aerated liquid, an outlet pipe for the deaerated liquid, and an air evacuation pipe;
a rotor with a shaft extending through the chamber, the shaft carrying means for centrifuging the liquid, and means for intensive agitation of the centrifuged liquid.

The device is further distinguished by the following characteristics:

It includes:

means for regulation of the flow of outgoing liquid in order to control the length of time of the agitation of the liquid;

a perforated envelope, separating the chamber into two zones, an admission zone with the intensive agitation and deaeration means and a zone of repose and discharge of the deaerated liquid, said perforated envelope being intended to cooperate in the regulation of the flow of deaerated liquid;

the closed chamber is an enclosure of general cylindrical form, the rotor shaft extending along the axis of revolution of the chamber, the centrifugation means are fins or vanes, preferably radial, and the air outlet pipe is disposed in the axis of revolution;

the perforated envelope is cylindrical, having the same axis of revolution as the axis of the chamber;

the intensive agitation means consist of surface elements and of openings permitting the radial circulation of the liquid, the surface elements being carried by the centrifugation means;

the intensive agitation means consist of a drum, preferably of a general cylindrical form, movable in rotation with the rotor, carried by the end of the centrifugation vanes, including a plurality of radial openings or perforations;

the cross sections of the perforations of the envelope are much smaller than those of the drum, so that the resistance to the outflow through the drum is negligible relative to the resistance to the outflow through the envelope, in order that the moving drum will remain immersed in the liquid and will agitate it during the period necessary for its deaeration;

preferably, the perforations of the drum and of the envelope are in general holes but could be slots; and the diameter of the holes in the envelope is about five times smaller than that of the holes in the drum.

Other characteristics of the invention will become evident from the description that follows.

The present invention offers the following advantages:

the outgoing liquid is completely deaerated: There is no longer any trace of air, which is not the case after decantation, even when the decantation period is long;

the deaeration is very fast: agitation for a few moments suffices;

the envelope acts also as filtering screen, making it possible to separate the large impurities that could stop up the injectors, notably when the deaerated liquid is intended to undergo another deinking;

the perforations of the envelope may be very fine and the device can then be used also as a fiber classifier, only a part of the fibers traversing the envelope while the other part is separated for subsequent treatment.

BRIEF DESCRIPTION OF THE DRAWINGS

For better comprehension of the invention, an embodiment of the invention has been illustrated in the annexed drawing, in which.

DESCRIPTION OF THE PREFERRED EMBODIMENT

Figure 1:
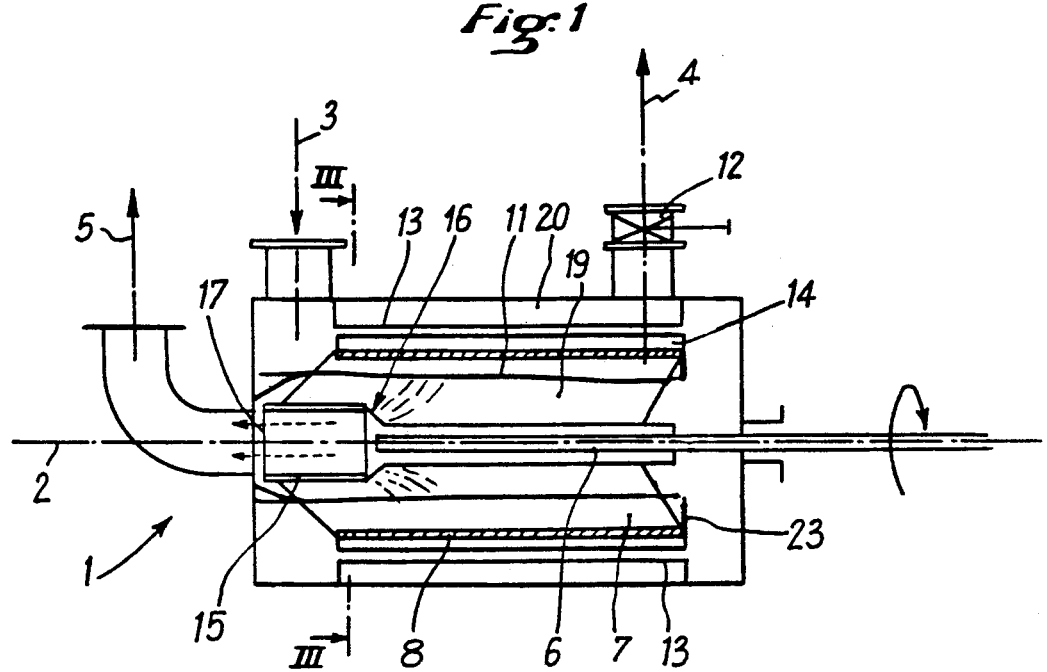
FIG. 1 is a schematic view in longitudinal section of the device according to the invention in a first embodiment.

As is seen in the drawing, the deaeration device according to the invention includes a preferably cylindrical closed chamber 1 with an axis of revolution 2, equipped with an inlet pipe 3 for aerated pulp, an outlet pipe 4 for deaerated pulp, and an air evacuation pipe 5.

Figure 3:
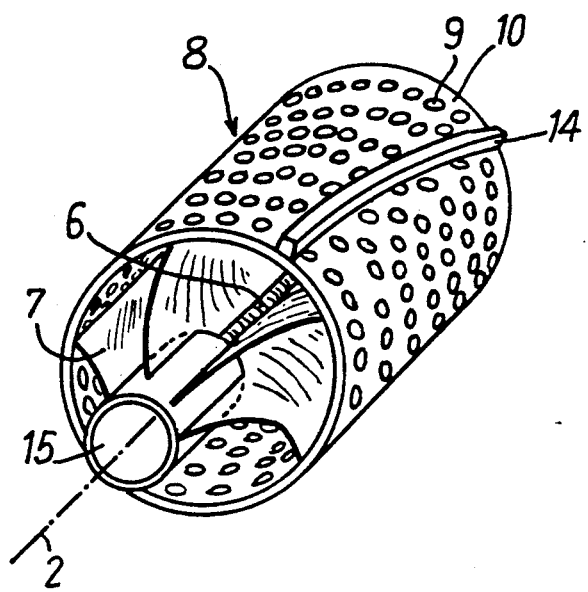
FIG. 3 is a perspective view of a centrifugation and agitation drum according to the invention.
Figure 4:
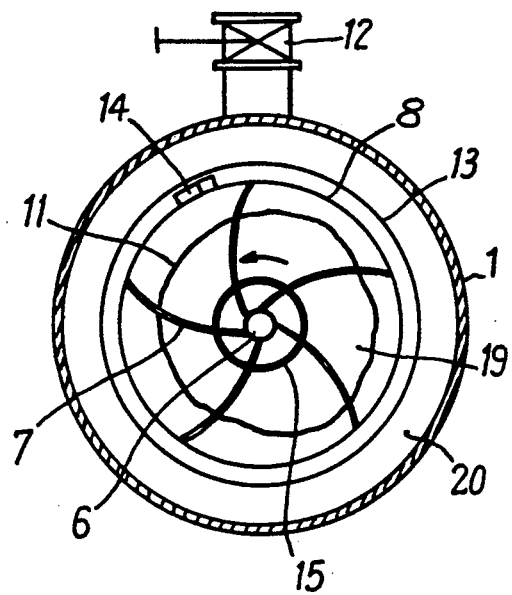
FIG. 4 is a view in transverse section of the drum of FIG. 3.

Inside this chamber 1 is disposed a rotor having a shaft 6 which extends in the axis 2 of revolution of chamber 1. This shaft carries centrifugation means and intensive agitation means for the centrifuged liquid. In the embodiment the centrifugation means are fins 7 or straight radial vanes; there may be provided also radial curved vanes whose form is represented in FIG. 3.

At the end of the vanes 7 are disposed surface elements intended to create great turbulences in the pulp projected by centrifugation toward the walls of the vat.

In the embodiment these surface elements comprise a drum 8, of general cylindrical form, coaxial with the axis of revolution 2, having a plurality of holes 9.

This drum constitutes an agitation means in the sense that the pulp, vigorously centrifuged by the vanes 7, in part strikes the surface elements 10 of the drum (that is, the unperforated part), the rest traversing the perforations 9. The flow of pulp is regulated in such a way that the pulp level 11 is sufficient for the surface of the drum to remain constantly immersed in the pulp.

Thus this perforated surface moves in a pulp subjected to a centrifugal force.

The dimensions of the perforations are such that, after its centrifugal projection, the pulp, being unable to flow out and get away from the vanes, returns toward the drum and, traversing it, is again subjected to its violent agitation.

The drum is only one variant of construction and can be replaced by any other equivalent assembly, constituting a cylindrical envelope with surface elements against which the pulp strikes, and this seems to break the bubbles and to release the air which, under the effect of the pressure gradient due to the centrifugation, is displaced toward the center, and with perforations for letting the pulp circulate through this cylindrical agitation envelope.

Alternatively, in the sense of the invention, a drum of conical form of revolution may be provided.

The device includes means for regulating the flow of the deaerated liquid.

It is, in fact, necessary that the pulp be agitated for a sufficiently long time for the deaeration to be complete.

To this end, the pulp is kept in the chamber by reducing the rate of outflow.

In a first variant, a simple valve 12 is disposed on the outlet pipe 4. However, in practice the rate of inflow must be constant, which is not the case because the incoming liquid contains a large proportion of air. Consequently, the quantity of pulp in chamber 1 can vary very quickly and the thickness of the ring of centrifuged pulp can diminish to the point that the agitation drum is no longer immersed in the pulp.

To eliminate this difficulty, advantageously there is arranged around the rotor a perforated envelope 13, which separates the chamber 1 into two zones: an inlet zone 19 containing the mechanical deaeration means: the rotor with its shaft, its vanes, and the drum, and an outlet zone 20 of repose of the deaerated liquid.

This envelope 13 has the function of cooperating in the regulation of the flow of deaerated liquid: To this end the dimensions of the perforations, holes or other forms are chosen so that their cross section is much smaller than that of the drum. The pressure loss in the drum is then negligible relative to the pressure loss of the envelope. The pulp is then retained in the admission zone against the envelope, which it traverses slowly, and it forms a cylinder of fairly stable thickness in which the drum is immersed.

Preferably, the diameter of the perforations of the envelope is about five times smaller than the diameter of the perforations of the drum. As a non-limiting example, the perforations of the envelope may have a diameter of 1 to 5 millimeters for performations of the drum of 5 to 25 millimeters in diameter; but the perforations of the envelope may be finer with a diameter less than 1 millimeter.

Furthermore, there is arranged on the rotor, at the radial periphery at least one blade 14 intended to sweep the inner surface of the envelope in order to avoid its clogging. In the example illustrated, this blade is disposed on the surface of the drum and extends over the entire length.

On the other hand, there is provided a tube 15 collecting the air extracted from the pulp. This tube is arranged coaxially with the axis of revolution 2 of the rotor, on the side of the air outlet pipe 5. This tube defines an air quieting zone; in fact, the air extracted by the combination of agitation and centrifugation undergoes, during its centripetal movement, the action of the vanes. The tube carried by the vanes is open at its two ends 16, 17, and the air can freely penetrate therein. The interior of the tube does not have vanes and hence the air present therein is at rest.

Figure 5:
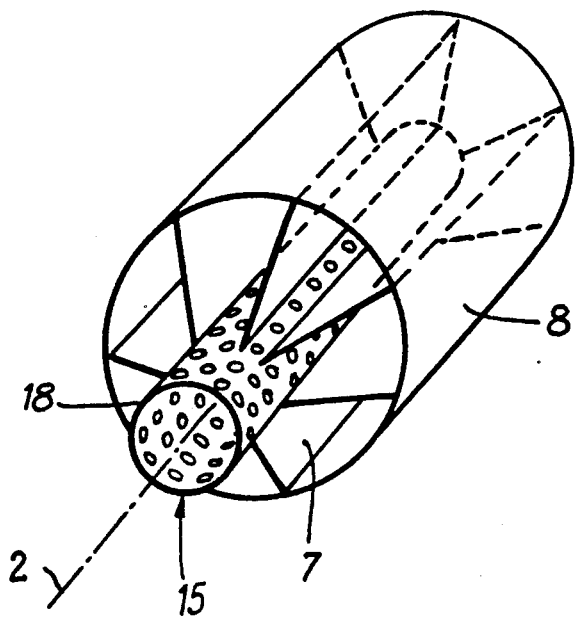
FIG. 5 is a perspective view of a alternative embodiment of the air collecting tube according to the invention.

This tube extends from the air outlet side so as to guide the air toward the outlet pipe 5, but it can extend also over a larger portion of shaft 6 an even constitute the shaft. In that case, for example (FIG. 5), the tube can carry the vanes 7 and have on its surface perforations 18 for circulation of air.

The device illustrated in FIG. 1 represents a first variant of construction: The entrance of the aerated pulp is disposed at one end of the chamber, perpendicularly to the axis of the chamber. The outlet pipe 4 for deaerated pulp is arranged on the side of the opposite end, so that the pulp runs the full length of the cylinder before being evacuated.

The air evacuation pipe 5 is arranged in the axis 2 on the side of the pulp admission pipe 3, opposite the elements driving the rotor.

Figure 2:
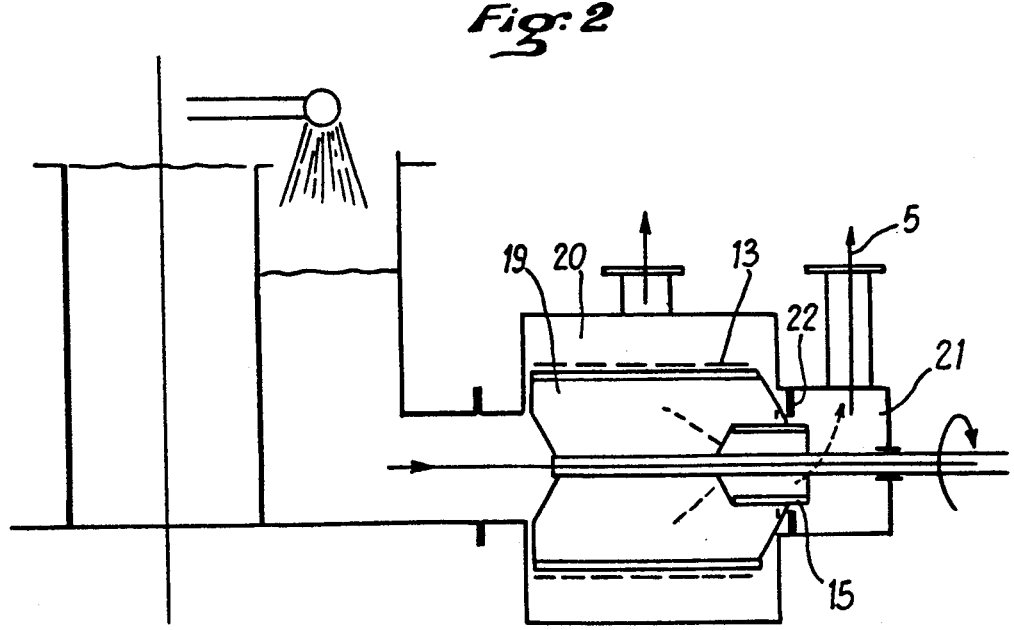
FIG. 2 is a schematic view in longitudinal section of the device according to the invention in a second embodiment.

In the variant of construction illustrated in FIG. 2, the pulp inlet pipe is situated in the axis 2 of the chamber, on the side opposite the rotor driving elements, and the evacuation of the air occurs on the side of said driving elements. The air collecting tube opens into an air receiving box 21 integral with the enclosure where the pipe 5 is disposed.

Further, there is disposed at the entrance of the air receiving box 21 a rim-shaped wall 22 intended to keep the pulp in the cylinder under the centrifugal action and to prevent it from leaving the cylinder and penetrating into said box.

Such a rim 23 may also be provided in the example of FIG. 1; it is mounted in that case at the end of drum 8 and extends toward the central axis 2 to form a retaining edge of the order of 20 to 30 millimeters.

The invention is not limited to the present device, and it covers also the process of deaeration itself: The pulp leaving the foam separator is introduced into the chamber 1 by the inlet pipe 3. The rotor is set in motion and the pulp is vigorously centrifuged with the aid of the vanes.

Under this action the pulp is projected onto the walls of the chamber, or rather onto the separation envelope 13. The valve 12 and the envelope 13 ensure a regulation of the flow to maintain a minimum quantity of pulp in the chamber.

The pulp is subjected, simultaneously with the centrifugation, to the mechanical action of agitators which destroy the fine bubbles and release the air which is displaced and gathers toward the central axis of the chamber.

The pulp, deaerated by the forced agitation which it undergoes, traverses the envelope 13 progressively and goes toward the outlet pipe 4.

Simultaneously the air collects at the center of the chamber evacuated by a simple conduit disposed in the central axis of said chamber.

As is seen, this process is continuous, which permits feeding directly at the exit to a new deinking cell or other device whose operation is continuous.

The device according to this invention offers many advantages:

The chamber operates equally well with a horizontal or a vertical cylinder;

The enclosure may be of any form, in the presence of a perforated envelope. It is the envelope which must be cylindrical and coaxial with the axis of the rotor in order to define a cylinder of centrifuged pulp of regular thickness;

The deaeration is practically total or at least more than sufficient for subsequent pulp transfer in the pipes of the treatment installation; and this regardless of the quality of the liquid at the entrance—whether it be water or a pulp heavily laden with chemical products or with air;

The perforated envelope further has a filtering effect thereby preventing the impurities from leaving the chamber and from being introduced into the injectors of the next deinking cell;

The perforated envelope has a function of automatic regulation of the flow whereby the device can be put to use without any preliminary device for regulating the rate of feed.

I claim:

1. A process for degasifying a gasified liquid, comprising the steps:
   introducing said liquid into a chamber;
   providing centrifugal means inside said chamber for rotating said liquid about an axis;
   rotating said liquid using said centrifugal means about said axis in said chamber to subject said liquid to centrifugal force to release gas from said liquid, said liquid moving to a region radially away from said axis, said released gas moving toward said axis;
   providing agitating means in said region for agitating liquid, said agitating means being radially substantially outward of said centrifugations means;
   simultaneously with said rotating, agitating said liquid in said region with said agitating means to aid in further release of gas;
   providing a duct having one open end positioned at said rotational axis and the other end leading externally of said chamber;
   removing said released gas from said chamber through said duct.

2. A process as in claim 1, wherein said process is continuous in operation.

3. A process as in claim 1, further comprising the steps:
   providing an outlet for degasified liquid from said chamber;
   controlling the rate of outflow via said outlet of liquid from said chamber to maintain said agitating means submerged in said liquid in said zone.

4. Device for degasifying a gasified liquid, said liquid containing suspended solids, comprising:
   a chamber having an inlet for input of said gasified liquid, an outlet opening for degasified liquid, and an outlet for gas discharge;
   a rotor within said chamber, said rotor including a shaft for rotation about an axis, means connected to said shaft for centrifugation of liquid delivered through said inlet, and means connected to said shaft for agitating said liquid during centrifugation;
   a static perforated envelope within said chamber, said envelope being substantially coextensive with said centrifugation means and enclosing said rotor, said envelope dividing said chamber into a first zone and a second zone, said means for centrifugation and said means for agitation being in said first zone, said first zone communicating with said liquid inlet and said gas outlet, said second zone being substantially coextensive with said first zone and communicating with said liquid outlet opening, said second zone being radially outwardly displaced from said axis and said first zone.

5. Device for degasifying a gasified liquid, said liquid containing suspended solids, comprising:
   a chamber having an inlet for said gasified liquid, an outlet opening for degasified liquid, and an outlet for gas discharge;
   a rotor within said chamber, said rotor including a shaft for rotation about an axis, means connected to said shaft for centrifugation of liquid delivered through said inlet, and means connected to said shaft for agitating said liquid during centrifugation;
   a static perforated envelope within said chamber, said envelope dividing said chamber into a first zone and a second zone, said first zone enclosing said means for centrifugation and said means for agitation and communicating with said liquid inlet and said gas outlet, said second zone communicating with said liquid outlet opening, said second zone being radially outwardly displaced from said axis and said first zone.

6. Device according to claim 5, and further comprising means for regulation of the rate of outflow of degasified liquid in order to control the agitation time of the liquid.

7. Device according to claim 6, and further comprising a flow regulating valve for controlling said liquid outlet opening.

8. Device according to claim 7, wherein the liquid inlet is directed generally coaxially to the axis of the rotor shaft.

9. Device according to claim 6, wherein the liquid inlet is directed generally coaxially to the axis of the rotor shaft.

10. Device as in claim 5, wherein
said rotor is of general cylindrical form;
the shaft of the rotor extends along the axis of rotation of the rotor,
the centrifugation means includes at least one of radial fins and vanes; and
the gas outlet is located proximate said axis of rotation.

11. Device according to claim 5 wherein the means for agitation include a drum of general cylindrical form, said drum being within said envelope and movable in rotation with the rotor, said drum having a plurality of openings for radial flow of said liquid therethrough.

12. Device according to claim 11, wherein the cross sections of the perforations of the envelope are smaller than those of the drum, loss of pressure of said liquid flowing through the drum is negligible relative to that of flow of said liquid through the envelope so that the moving drum remains immersed in the liquid, agitating the liquid for the time necessary for its degasification.

13. Device according to claim 12 wherein the diameter of the perforations of the envelope is about 5 times smaller than the diameter of the perforations of the drum.

14. Device according to claim 13, wherein the liquid inlet is directed generally coaxially to the axis of the rotor shaft.

15. Device according to claim 12, wherein the liquid inlet is directed generally coaxially to the axis of the rotor shaft.

16. Device according to claim 11, wherein the liquid inlet is directed generally coaxially to the axis of the rotor shaft.

17. Device according to claim 10, wherein the liquid inlet is directed generally coaxially to the axis of the rotor shaft.

18. Device according to claim 10 wherein in the immediate vicinity of the air outlet the centrifugation means carry a tube coaxial with the rotor shaft to receive and guide gas extracted from the liquid toward said gas outlet.

19. Device according to claim 5, wherein the perforated envelope separating the chamber, is cylindrical about the same axis as the axis of the shaft.

20. Device according to claim 19 wherein the agitation means includes at least one longitudinal blade coextensive with the perforated envelope for unclogging said envelope by motion of said blade relative to said envelope.

21. Device according to claim 20, wherein the liquid inlet is directed generally coaxially to the axis of the rotor shaft.

22. Device according to claim 19, wherein the liquid inlet is directed generally coaxially to the axis of the rotor shaft.

23. Device according to claim 5, wherein the means for agitation include surface elements carried by the centrifugation means and movable in rotation with said centrifugation means, said surface elements having openings permitting the radial circulation therethrough of the liquid.

24. Device according to claim 23 wherein the means for agitation include a drum of general cylindrical form, said drum being within said envelope and movable in rotation with the rotor, said drum having a plurality of openings for radial flow of said liquid therethrough.

25. Device according to claim 24, wherein the cross sections of the perforations of the envelope are smaller than those of the drum, loss of pressure of said liquid flowing through the drum is negligible relative to that of flow of said liquid through the envelope so that the moving drum remains immersed in the liquid, agitating the liquid from the time necessary for its degasification.

26. Device according to claim 23 wherein the agitation means includes at least one longitudinal blade coextensive with the perforated envelope for unclogging said envelope by motion of said blade relative to said envelope.

27. Device according to claim 23, wherein the liquid inlet is directed generally coaxially to the axis of the rotor shaft.

28. Device according to claim 5, wherein the liquid inlet is directed generally coaxially to the axis of the rotor shaft.

29. Device according to claim 5, and further comprising a flow regulating valve for controlling said liquid outlet opening.

* * * * *